(12) United States Patent
Takano et al.

(10) Patent No.: US 11,630,288 B2
(45) Date of Patent: Apr. 18, 2023

(54) IMAGE PROJECTION APPARATUS

(71) Applicants: Yohei Takano, Kanagawa (JP); Shigeaki Imai, Kanagawa (JP); Kazuhiro Fujita, Tokyo (JP); Makoto Hirakawa, Tokyo (JP)

(72) Inventors: Yohei Takano, Kanagawa (JP); Shigeaki Imai, Kanagawa (JP); Kazuhiro Fujita, Tokyo (JP); Makoto Hirakawa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/462,109

(22) Filed: Aug. 31, 2021

(65) Prior Publication Data
US 2022/0066177 A1  Mar. 3, 2022

(30) Foreign Application Priority Data

Aug. 31, 2020 (JP) .............................. JP2020-145697

(51) Int. Cl.
*G02B 13/16* (2006.01)
*G02B 5/00* (2006.01)
(Continued)

(52) U.S. Cl.
CPC ............. *G02B 13/16* (2013.01); *G02B 5/003* (2013.01); *G02B 7/02* (2013.01); *G02B 13/22* (2013.01);
(Continued)

(58) Field of Classification Search
CPC .... G03B 21/008; G03B 21/28; G03B 21/208; G03B 21/2053; G03B 21/2066; H04N 9/3102; H04N 9/3105; H04N 9/3108; H04N 9/3114; H04N 9/3141; H04N 9/3155; H04N 9/3158; G02B 27/02; G02B 27/0101; G02B 27/0172; G02B 27/0988; G02B 27/0018; G02B 5/003; G02B 5/005; G02B 5/0284;
(Continued)

(56) References Cited

U.S. PATENT DOCUMENTS 6,220,713 B1 * 4/2001 Tadic-Galeb .......... G03B 21/28
353/77
RE45,258 E 11/2014 Takaura et al.
(Continued)

FOREIGN PATENT DOCUMENTS

JP 2001-042256 2/2001
JP 2017-032964 2/2017

*Primary Examiner* — Sultan Chowdhury
(74) *Attorney, Agent, or Firm* — Xsensus LLP

(57) ABSTRACT

An image projection apparatus includes: a light source; an image display element including multiple micromirrors arranged in two dimensions, the multiple micromirrors forming an image display plane, each micromirror having a reflecting surface; and a projection optical system. Conditional expressions (1) and (2) below are satisfied:

$\theta 1 \geq 14(\deg)$ (1)

$1.2 < BF/L < 2.2$ (2)

where $\theta 1$ is a maximum tilt angle of the reflecting surface of each micromirror with respect to the image display plane, L is a diagonal length of the image display plane, and BF is a distance between a vertex of a lens within the projection optical system and closest to the image display plane and the image display plane along an optical axis of the projection optical system.

8 Claims, 10 Drawing Sheets

(51) Int. Cl.
*G02B 7/02* (2021.01)
*G02B 26/08* (2006.01)
*G03B 21/00* (2006.01)
*G02B 13/22* (2006.01)
*G03B 21/20* (2006.01)

(52) U.S. Cl.
CPC ....... *G02B 26/0833* (2013.01); *G03B 21/008* (2013.01); *G03B 21/2026* (2013.01)

(58) Field of Classification Search
CPC ........ G02B 5/05; G02B 5/0816; G02B 13/12; G02B 13/16; G02B 13/22; G02B 13/26; G02B 26/0816; G02B 26/0825; G02B 26/0833; G02B 26/0841; G02B 26/0858; G02B 26/0883
See application file for complete search history.

(56) References Cited

U.S. PATENT DOCUMENTS

| | | | |
|---|---|---|---|
| 9,864,177 B2 * | 1/2018 | Takano | G02B 15/1421 |
| RE48,309 E | 11/2020 | Takaura et al. | |
| 2002/0085181 A1 * | 7/2002 | Davis | G02B 13/22 |
| | | | 348/E9.027 |
| 2009/0015801 A1 | 1/2009 | Takaura et al. | |
| 2009/0015910 A1 | 1/2009 | Takaura et al. | |
| 2009/0141370 A1 | 6/2009 | Takaura et al. | |
| 2009/0213470 A1 | 8/2009 | Abe et al. | |
| 2010/0039625 A1 | 2/2010 | Takaura et al. | |
| 2010/0128225 A1 * | 5/2010 | Nishino | G09G 3/346 |
| | | | 353/31 |
| 2013/0235356 A1 | 9/2013 | Takahashi et al. | |
| 2014/0002803 A1 | 1/2014 | Abe et al. | |
| 2014/0268073 A1 | 9/2014 | Takano | |
| 2014/0340658 A1 | 11/2014 | Takano et al. | |
| 2015/0234158 A1 | 8/2015 | Tatsuno et al. | |
| 2015/0370048 A1 | 12/2015 | Takano | |
| 2016/0103304 A1 | 4/2016 | Takano et al. | |
| 2017/0059971 A1 | 3/2017 | Takano et al. | |
| 2017/0064266 A1 | 3/2017 | Nakatsu | |
| 2017/0131531 A1 * | 5/2017 | Brukilacchio | G02B 17/0868 |
| 2017/0293125 A1 | 10/2017 | Takano | |
| 2018/0003934 A1 | 1/2018 | Takano et al. | |
| 2018/0074302 A1 | 3/2018 | Takano et al. | |
| 2018/0299759 A1 * | 10/2018 | Kuboya | G03B 21/16 |
| 2018/0307041 A1 * | 10/2018 | Masui | G02B 27/0081 |
| 2019/0285979 A1 | 9/2019 | Takano et al. | |
| 2020/0201008 A1 | 6/2020 | Takano et al. | |

* cited by examiner

IMAGE PROJECTION APPARATUS

CROSS-REFERENCE TO RELATED APPLICATIONS

This patent application is based on and claims priority pursuant to 35 U.S.C. § 119(a) to Japanese Patent Application No. 2020-145697, filed on Aug. 31, 2020, in the Japan Patent Office, the entire disclosure of which is incorporated by reference herein.

BACKGROUND

Technical Field

The present disclosure relates to an image projection apparatus.

Related Art

In recent years, image projection apparatuses (projectors) that magnify and project various images onto a screen have been widely used. A projector includes at least a light source, a spatial light modulator (an image display element) such as a digital micromirror device (DMD) or a liquid crystal display (LCD), and a projection optical system such as a projection lens or a projection mirror. Light emitted by the light source is condensed on the spatial light modulator, and the spatial light modulator modulates the light according to an image signal and emits (reflects) the light toward a screen through the projection optical system as a color image.

In a projector, an ultra-high pressure mercury lamp with high brightness has been mainly used as a light source. However, the ultra-high pressure mercury lamp requires frequent maintenance because of short life, and contains mercury that is harmful to the environment. Because of such frequent maintenance and environment protection, a solid-state light source such as a laser light source or a light emitting diode (LED) light source has been coming into wide use. A laser light source and an LED light source have a long life and a good color reproducibility because of their good monochromaticity. Projectors using the ultra-high pressure mercury lamp may be expected to be used for special purposes only in the future, and most projectors in the market may be expected to use a solid-state light source in the future.

SUMMARY

An image projection apparatus includes: a light source configured to emit light; an image display element configured to reflect the light emitted from the light source, the image display element including multiple micromirrors each having a reflecting surface, the multiple mirrors arranged in two dimensions and forming an image display plane, each micromirror configured to change an angle of the reflecting surface with respect to the image display plane to change a direction of the light reflected by the reflecting surface; and a projection optical system configured to project the light reflected from the image display element onto a projection surface. Conditional expressions (1) and (2) below are satisfied:

$$\theta 1 \geq 14 (\deg) \quad (1)$$

$$1.2 < BF/L < 2.2 \quad (2)$$

where $\theta 1$ is a maximum tilt angle of the reflecting surface of each micromirror with respect to the image display plane, L is a diagonal length of the image display plane, and BF is a distance between a vertex of a lens within the projection optical system and closest to the image display plane and the image display plane along an optical axis of the projection optical system.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
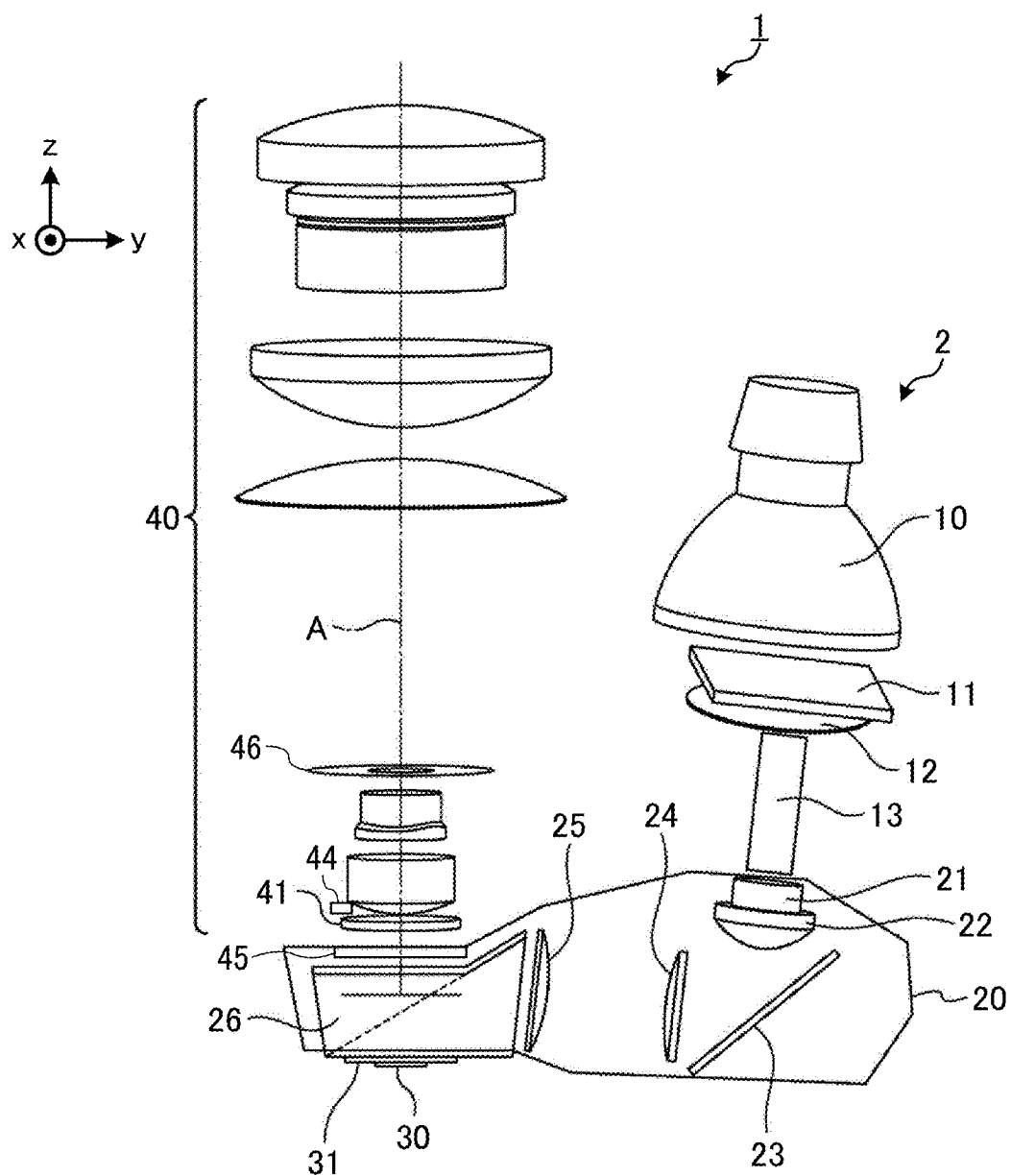
FIG. 1 is an illustration of an overall configuration of an image projection apparatus according to a first embodiment of the present invention.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

According to embodiments of the present disclosure, the contrast ratio of the projection image increases, the size of the projection optical system (projection lens) and the size of the image projection apparatus (projector) is reduced.

Hereinafter, the image projection apparatus according to embodiments of the present invention is described in detail with reference to the drawings. The present disclosure is not limited to the following embodiments, and the constituent elements of the embodiments includes those which can be easily conceived by those skilled in the art, substantially the same ones, and those in the following embodiments include those which can be easily conceived by those skilled in the art, substantially the same, and within equivalent ranges. Furthermore, various omissions, substitutions, changes and combinations of constituent elements can be made without departing from the gist of the following embodiments.

Conventional resolution of the DMD is extended graphics array (XGA) or super extended graphics array (SXGA). Currently, the resolution of the DMD shifts to full high definition (HD), further to 4K for a higher resolution image. Some projectors with 8K resolution have appeared, and projectors with 4K or 8K resolution are expected to be the mainstream in the market in the near future. A higher resolution spatial light modulator such as 4K or 8K contains a larger number of pixels. These pixels are arrayed in two dimensions, and the shape of the pixel array is typically rectangular. Hereafter, the rectangular area of the pixel array is referred to as an image display plane or an image display area. In a spatial light modulator with a higher resolution, the size of the image display area of the spatial light modulator becomes larger in proportional to the number of pixels, where the size of one pixel is constant. When the size of the spatial light modulator becomes larger, the size of an image circle of the projection lens also becomes larger according to the size of the spatial light modulator. As a result, the size of the projection lens may become larger. The size of the projector may also become larger.

Techniques for achieving higher resolution while reducing the size of the spatial light modulator have been developed, and one technique is called a pixel shift technique. In an example of the pixel shift technique, a parallel flat plate is disposed in the optical path of the projection optical system, and by tilting the parallel flat plate with respect to the optical path, and the optical path splits into two or more paths to increase the number of pixel. When the parallel flat plate is disposed between the spatial light modulator and the projection lens, a certain extent of backfocus of the projection lens is required because the parallel flat plate has some thickness to split the optical path. As a result, a ratio of the projection optical system to the image projection apparatus may become larger.

As described above, the size of spatial light modulator becomes larger as the resolution of the spatial light modulator becomes higher, and the projection optical system also becomes larger. Since the parallel flat plate for the pixel shift technique is disposed in the optical path between the DMD and the projection lens, the backfocus of the projection lens becomes longer, and the size occupied by the projection optical system in the projector increases, and the projector itself tends to become larger. When the projection optical system becomes larger as described above, off light from the DMD, diffraction light from the DMD at an off state, or stray light may enter the projection optical system and the contrast ratio of the projection image becomes lower. The stray light is, for example, light generated by unexpected reflection in mechanical members for the illumination optical system.

First Embodiment

Referring to FIG. 1, the overall configuration of an image projection apparatus 1 according to the first embodiment is described below.

As illustrated in FIG. 1, the image projection apparatus 1 includes an image display device 2 and a projection optical system 40. The image display device 2 generates image light from illumination light emitted by a light source 10 based on image information, and the projection optical system 40 projects the image light onto a projection surface such as a screen or a wall. The projection optical system 40 illustrated in FIG. 1 is a telecentric optical system.

As illustrated in FIG. 1, the image display device 2 includes the light source 10, an explosion-proof 11, a color wheel 12, a light tunnel 13, an illumination optical system 20, a DMD 30, and a cover glass 31.

The light source 10 is, for example, a lamp such as an ultra-high pressure mercury lamp. The explosion-proof glass 11 protects the light source 10. The explosion-proof glass 11 is, for example, a glass plate that prevents any other components of the image projection apparatus from being damaged by, for example, a broken piece of the lamp that breaks. The color wheel 12 separates the illumination light emitted from the light source 10 into predetermined colors (e.g., red, green, and, blue). The color wheel 12 is, for example, a circular glass plate with several different color segments. The light tunnel 13 guides the illumination light transmitted through the color wheel 12 to the illumination optical system 20. The light tunnel 13 is, for example, a rod (solid or hollow) prism.

The illumination optical system 20 guides the illumination light from the light source to the DMD 30. As illustrated in FIG. 1, the illumination optical system 20 includes a first relay lens 21, a second relay lens 22, a mirror 23, a third relay lens 24, a fourth relay lens 25, and a total internal reflection (TIR) prism 26.

The first relay lens 21 and the second relay lens 22 relay the illumination light passed through the light tunnel 13 to the mirror 23. The mirror 23 reflects the illumination light passed through the second relay lens 22 and bends the direction of the illumination light. The third relay lens 24 and the fourth relay lens 25 guide the illumination light reflected by the mirror 23 to the TIR prism 26.

The TIR prism 26 is formed by joining two triangular prisms. In the TIR prism 26, one surface of one triangular prism satisfies the condition of the total internal reflection and reflects the incident illumination light from the fourth relay lens 25 toward the DMD 30 and passes the light reflected by the DMD 30 toward outside of the TIR 26.

Figure 2A:
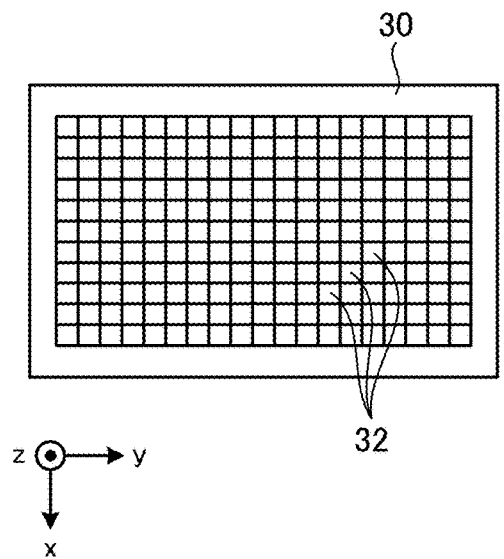
FIG. 2A is a schematic view of a DMD including a movable micromirror array in the image projection apparatus.

As illustrated in FIG. 2A, the DMD 30 has a two-dimensional array of movable micromirrors 32 and each movable micromirror 32 reflects the incident illumination light. The array of the movable micromirrors is rectangular and the array of the movable micromirrors forms an image display plane. Each movable micromirror 32 of the DMD 30 rotates around predetermined axes and switches between an on state and an off state at two different rotation positions. In the on state, the movable micromirror reflects the incident illumination light toward one predetermined direction (i.e., toward the projection optical system 40), whereas in the off state, the movable micromirror reflects the incident illumination light toward the other predetermined direction. In the present embodiment, each movable micromirror of the DMD 30 has a first rotation axis and a second rotation axis, and the first rotation axis and the second rotation axis extend in different directions. The specific configuration of the DMD 30 is described later.

The DMD 30 is disposed on a lower side in FIG. 1 of the TIR prism 26, and the cover glass 31 is disposed between the DMD 30 and the total internal reflection prism 26. The light reflected by the DMD 30 passes through an upper surface in FIG. 1 of the total internal reflection prism 26. The projection optical system 40 is disposed above the total internal reflection prism 26 in FIG. 1 (i.e., the projection optical system 40 is disposed downstream from the TIR prism 26 in the direction of propagation of the light from the light source 10).

Each of the elements disposed in the light source 10, the illumination optical system 20, and the DMD 30 is held in a metal or plastic housing.

The projection optical system 40 projects the light reflected from the DMD 30 (i.e., the on light or image light) through the TIR prism 26 onto a projection surface such as a screen or a wall. Among the optical elements included in the projection optical system 40, a lens that the light reflected from the DMD 30 enters first, that is, a lens arranged at the closest to the DMD 30, is referred to as a first lens 41 of the projection optical system 40. As illustrated in FIG. 1, an optical axis of the projection optical system 40 is referred to as an optical axis A. The projection optical system 40 is housed in a lens barrel and fixed to the metal or plastic housing described above.

As described above, the illumination light emitted from the light source 10 enters the illumination optical system 20 through the explosion-proof glass 11, the color wheel 12, and the light tunnel 13. In the illumination optical system 20, the illumination light passes through a path of the first relay lens 21, the second relay lens 22, the mirror 23, the third relay lens 24, the fourth relay lens 25, and the total reflection prism 26, and reaches the DMD 30.

In the example described above, the light source 10 is a lamp, but is not limited to a lamp. The light source 10 may be another type of light source such as semiconductor laser light source or an LED light source.

Figure 2B:
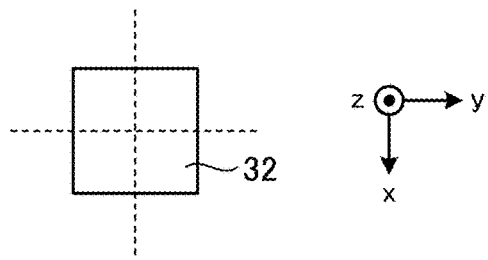
FIG. 2B is a schematic view of a single movable micromirror (pixel) of the micromirror array of the DMD.
Figure 2C:
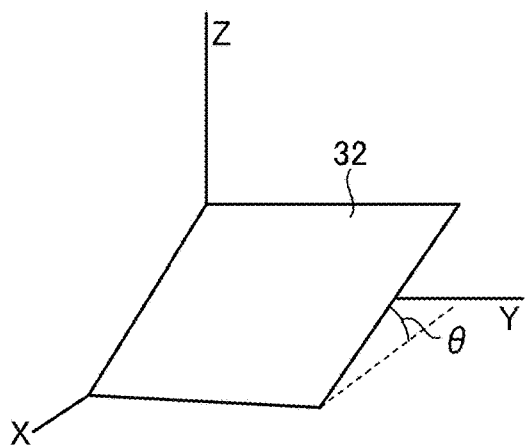
FIG. 2C is a schematic view of the single movable micromirror tilted in one direction.
Figure 2D:
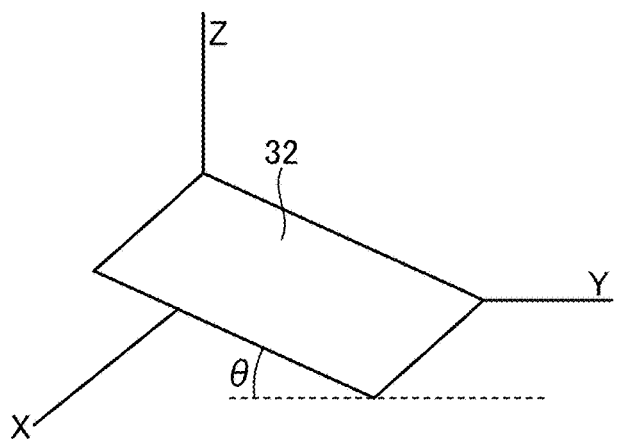
FIG. 2D is a schematic view of the single movable micromirror tilted in another direction.
Figure 3:
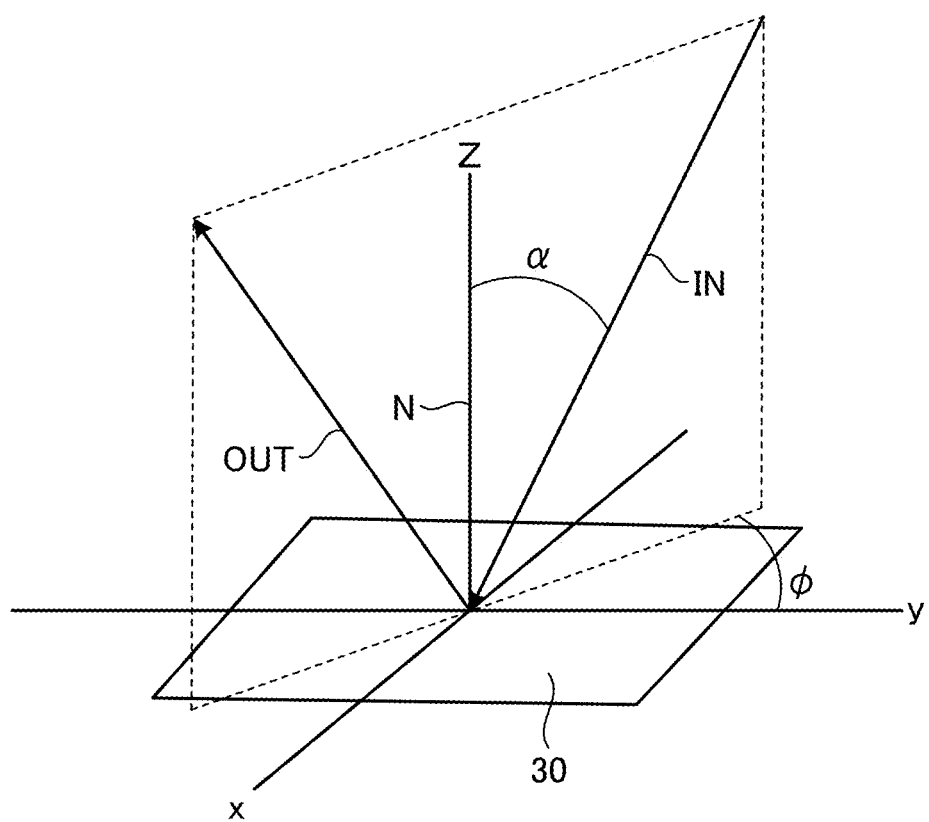
FIG. 3 is an illustration of an incident angle and an azimuth angle of illumination light with respect to an image display plane of the DMD.
Figure 4A:
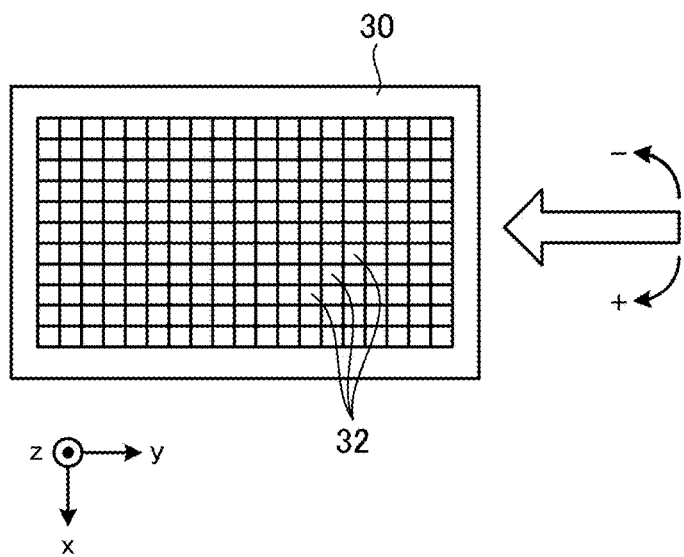
FIG. 4A is an illustration describing a relation between incident illumination light and the DMD, where the incident illumination light is parallel to a longer side of the DMD.
Figure 4B:
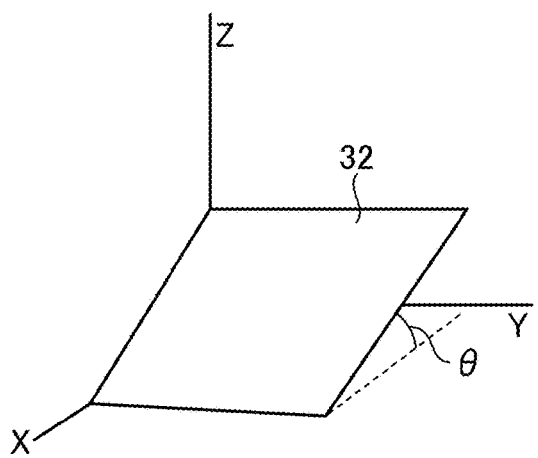
FIGS. 4B and 4C are schematic views of the single movable micromirror at "OFF" state and "ON" state, respectively.
Figure 4C:
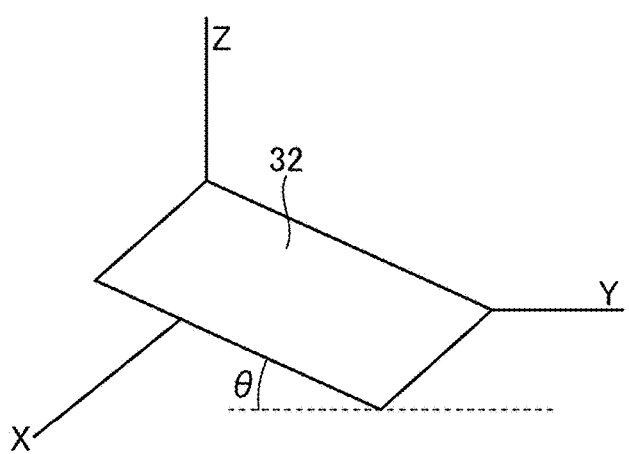
Figure 5A:
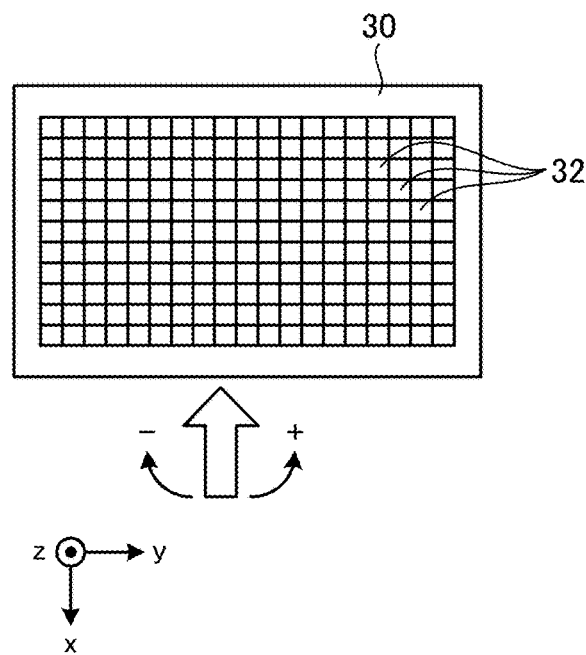
FIG. 5A is an illustration describing a relation between the incident illumination light and the DMD, where the incident illumination light is parallel to a shorter side of the DMD.
Figure 5B:
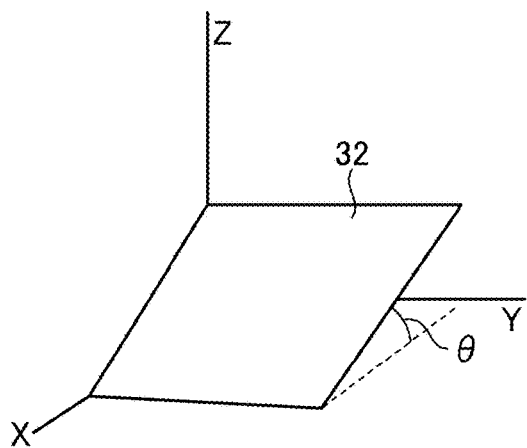
FIGS. 5B and 5C are schematic views of the single movable micromirror at "ON" state and "OFF" state, respectively.
Figure 5C:
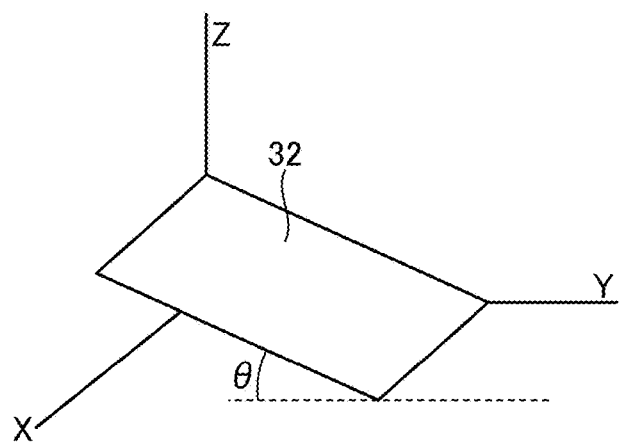

FIG. 2A is a schematic view of a DMD including a movable micromirror array. FIG. 2B is an enlarged view of a single movable micromirror (pixel) of the movable micromirror array of the DMD. FIG. 2C is a schematic view of the single movable micromirror that tilts in one direction. FIG. 2D is a schematic view of the single movable micromirror that tilts in another direction. FIG. 3 is an illustration of an incident angle and an azimuth angle of the illumination light with respect to a plane of the DMD 30 (image display plane). FIG. 4A is an illustration of a relation between the incident illumination light and the DMD 30, where the incident illumination light is depicted as an open arrow and is parallel to the longer side of the DMD. FIGS. 4B and 4C are schematic view of the single movable micromirror at the off state and the on state, respectively. FIG. 5A is an illustration of a relation between the incident illumination light and the DMD 30, where the incident illumination light is depicted as an open arrow and is parallel to the shorter side of the DMD 30. FIGS. 5B and 5C are schematic view of the single movable micromirror in the on state and the off state, respectively. Referring to FIGS. 2 to 5, the configuration and operation of the DMD 30 are described below.

As illustrated in FIG. 2A, the DMD 30 has a two-dimensional array of movable micromirrors 32. The side length of one movable micromirror 32 is from several micrometers to less than 20 micrometers, and each micromirror is movable (rotatable). A large number of micromirrors is included in the array. The array of movable micromirrors is rectangular and the array of the movable micromirrors forms an image display plane (image display area). In FIG. 2A, a small number of movable micromirrors 32 of the DMD 30 is illustrated for the sake of simplicity. However, the actual number of the movable micromirrors 32 in the array of the DMD 30 is, for example, 4096×2160. Each movable micromirror 32 is a pixel. Each movable micromirror 32 is usually square as illustrated in FIG. 2B, and the length of one side of the square is, for example, 5.4 μm. The diagonal length of the array of movable micromirrors (the image display plane or area) of the DMD 30 is, for example, about 25 mm.

The movable micromirror 32 reflects the incident illumination light in one direction by rotating around one axis, and reflects the incident illumination light in another direction by rotating around another axis. The illumination light incident on the DMD 30 is reflected in one direction by the movable micromirror 32 as the movable micromirror 32 rotates in one direction. The light reflected by the movable micromirror 32 reaches the screen through the TIR prism 26 and the projection optical system 40. A state in which the movable micromirror 32 is tilted in one direction to reflect the light to the screen is referred to as an on state, and the light reflected by the tilted movable micromirror 32 in the on state is referred to as on light. On the other hand, when the movable micromirror 32 rotates in another direction, the illumination light incident on the DMD 30 is reflected in another direction by the movable micromirror 32. In this case, the light reflected by the movable micromirror 32 does not reach the screen but goes through the TIR prism 26 in a direction away from the projection optical system 40. A state in which the movable micromirror 32 is tilted in another direction to reflect light in a direction away from the projection lens is referred to as an off state, and the light reflected by the tilted movable micromirror 32 in the off state is referred to as off light.

The TIR prism 26 has at least one surface that satisfies the condition of the total internal reflection. Light incident on this surface is reflected or allowed to pass through the TIR prism 26 depending on the incident angle of the light. The TIR prism 26 transmits the light reflected by the movable micromirror 32 at the on state toward the projection optical system 40. On the other hand, the TIR prism 26 reflects the light reflected by the movable micromirror 32 at the off state in the direction away from the projection optical system 40.

The movement of the movable micromirror 32 is described below. The movable micromirror 32 has two rotation axes and rotates around the two rotation axes as illustrated in FIGS. 2C and 2D. In x-y-z (or X-Y-Z) coordinate systems illustrated in FIGS. 2A to 2D, one side of the movable micromirror 32 is parallel to the x-direction (x-axis), and the other side of the movable micromirror 32 is parallel to the y-direction (y-axis). The x-direction (x-axis) and the y-direction (y-axis) are orthogonal to each other.

In FIG. 2C, the movable micromirror 32 rotates (tilts) around a rotation axis parallel to the y-direction. The rotation axis parallel to the y-direction is referred to as a first rotation axis. The movable micromirror 32 rotated (tilted)

around the first rotation axis in a predetermined rotation direction ("first direction") reflects the illumination light incident on the DMD 30 in a predetermined reflection direction ("first reflection direction") as the on light.

On the other hand, in FIG. 2D, the movable micromirror 32 rotates around a rotation axis parallel to the x-direction. The rotation axis parallel to the x-direction is referred to as a second rotation axis. The movable micromirror 32 rotated (tilted) around the second axis in a predetermined rotation direction ("second direction"), which is different from the first direction, reflects the illumination light incident on the DMD 30 in a second reflection direction as the off light. The second reflection direction is different from the first reflection direction.

When the movable micromirror 32 is rotated around the first rotation axis and the second rotation axis, rotation angles (tilt angles) of the reflecting surface of the movable micromirror 32 with respect to the x-y plane are defined by 0°.

In the present embodiment, the first rotation axis and the second rotation axis of the movable micromirror 32 are each parallel to one side of the movable micromirror 32, but are not limited thereto. For example, the first rotation axis and the second rotation axis may be coincident with the respective diagonal lines of the square movable micromirror 32.

Referring to FIG. 3, the incident angle and the azimuth angle with respect to the image display plane of the DMD 30 are described below. For evaluating the performance of the image display device 2 used in the image projection apparatus 1, several image qualities of the projection image (projected image) are provided. A contrast ratio (i.e., ratio of light and dark in brightness) is one of these image qualities. When the light reflected by the movable micromirror 32 of the DMD 30 in the off state enters the projection optical system 40, the contrast ratio decreases, and the image quality of the projection image deteriorates. One of factors that determines the contrast ratio is an incident angle with respect to the normal of the movable micromirror 32. In one or more embodiments, an incident angle is considered, and moreover an azimuth angle that is an angle formed with respect to the side of the image display plane of the DMD 30, is also considered.

The image display plane of the DMD 30 is defined as a plane formed by the array of the movable micromirrors 32. Referring to FIG. 3, an angle formed between the normal line N of the image display plane and the incident light IN (illumination light) is defined as an incident angle α, and an angle formed between the incident light IN and the y-axis (or x-axis), which is one side of the image display plane, is defined as an azimuth angle φ. In an example illustrated in FIG. 3, the direction parallel to the longer side of the DMD 30 is defined as the y-axis. As illustrated in FIG. 3, the incident light IN, the normal line N, and the emitted light OUT (reflected light) are in the same plane. The normal line N of the image display plane is parallel to the optical axis A (see FIG. 1) of the projection optical system 40.

Referring to FIGS. 4A to 4C, the movement of the movable micromirror 32 and the directional change of the reflection light are described. In FIGS. 4A to 4C, the illumination light enters the DMD 30 along the y-direction parallel to the longer side of the DMD 30.

FIG. 4A is an illustration describing a relation between the illumination light and the DMD 30, where the illumination light enters the DMD 30 along the y-direction parallel to the longer side of the DMD 30. The illumination light enters the image display plane at a certain angle (i.e., incident angle) with respect to the normal line of the image display plane and goes out with the same angle as the incident angle. FIGS. 4B and 4C are enlarged views of a single movable micromirror 32. FIG. 4B is an illustration of the off state of the movable micromirror 32, and FIG. 4C is an illustration of the on state of the movable micromirror 32. When the movable micromirror 32 is in the on state (FIG. 4C), the light reflected by the movable micromirror 32 enters the projection optical system 40. When the movable micromirror 32 is in the off state (FIG. 4B), the light reflected by the movable micromirror 32 is reflected in a direction different from the direction in the on state.

In FIG. 4A, the direction of the incident illumination light depicted as an open arrow is parallel to the y-axis and the azimuth angle φ according to FIG. 3 is 0°. When the direction of the incident illumination light is changed, the azimuth angle is increased or decreased. In other words, the incident illumination light has a certain angle with respect to a side of the image display plane of the DMD 30. When the movable micromirror 32 rotates around the first rotation axis parallel to the y-axis and is in the off state (FIG. 4B), a direction of change in the azimuth angle to have a smaller incident angle for the incident illumination light with respect to the movable micromirror 32 is defined as plus, another direction of change in the azimuth angle to have a larger incident angle for the incident illumination light with respect to the movable micromirror 32 is defined as minus. In FIG. 4A, such two directions of change are referred to as plus "+" and minus "−", respectively. When the incident angle for the incident illumination light becomes larger, the reflection angle also becomes larger. As a result, the reflected light from the DMD is not likely to enter the first lens 41 of the projection optical system and the contrast ratio is increased (This enables the light reflected from the DMD less likely to enter the first lens 41 of the projection optical system and thus achieves an increase in contrast ratio).

Referring to FIGS. 5A to 5C, the movement of the movable micromirror 32 and the directional change of the reflection light are described. In FIGS. 5A to 5C, the illumination light enters the DMD 30 along the x-direction parallel to the shorter side of the DMD 30.

In FIG. 5A, the direction of the incident illumination light depicted as an open arrow is parallel to the x-axis. When the direction of the incident illumination light is changed, the azimuth angle is increased or decreased. In other words, the incident illumination light has a certain angle with respect to a side of the image display plane of the DMD 30. When the movable micromirror 32 rotates around the second rotation axis parallel to the x-axis and is in the off state (FIG. 5C), and a direction of change in the azimuth angle to have a smaller incident angle for the illumination light with respect to the movable micromirror 32 is defined as plus, on the other hand, another direction of change in the azimuth angle to have a larger incident angle for the illumination light with respect to the movable micromirror 32 is defined as minus. In FIG. 5A, two move directions are referred to as plus "+" and minus "−", respectively. When the incident angle for the incident illumination light becomes larger, the reflection angle also becomes larger. As a result, the reflected light by the DMD is not likely to enter the first lens 41 of the projection optical system and the contrast ratio is increased.

In the embodiments according to FIGS. 4A to 4C and FIGS. 5A to 5C, the azimuth angle may be optimized by optical design or using an adjusting member. Specifically, the azimuth angle of the illumination light is changed by rotating the TIR prism 26 or the DMD about the normal direction to the image display plane of the DMD 30.

Figure 6:
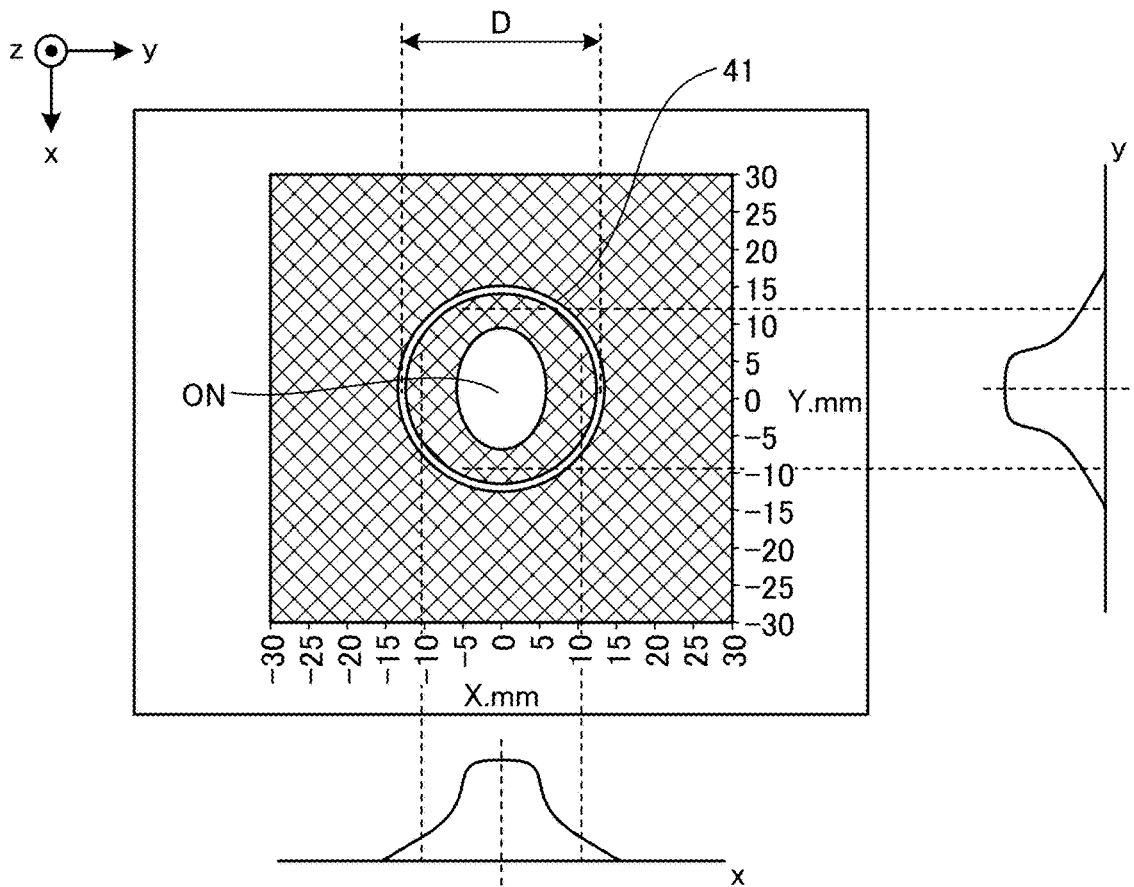
FIG. 6 is an illustration of an illuminance distribution of the "ON" light on the DMD.
Figure 7:
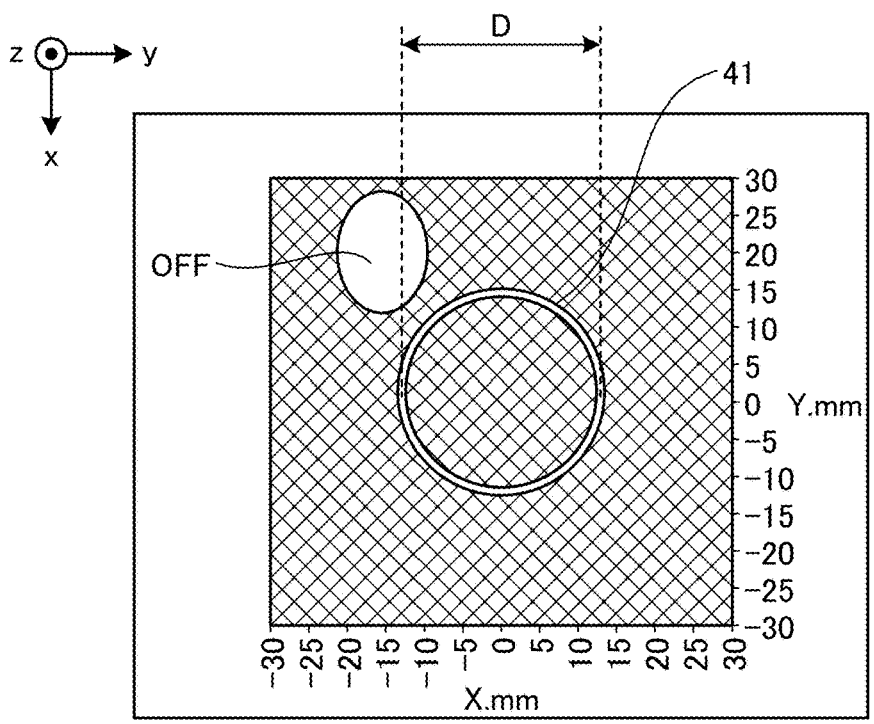
FIG. 7 is an illustration of an illuminance distribution of the "OFF" light on the DMD.
Figure 8A:
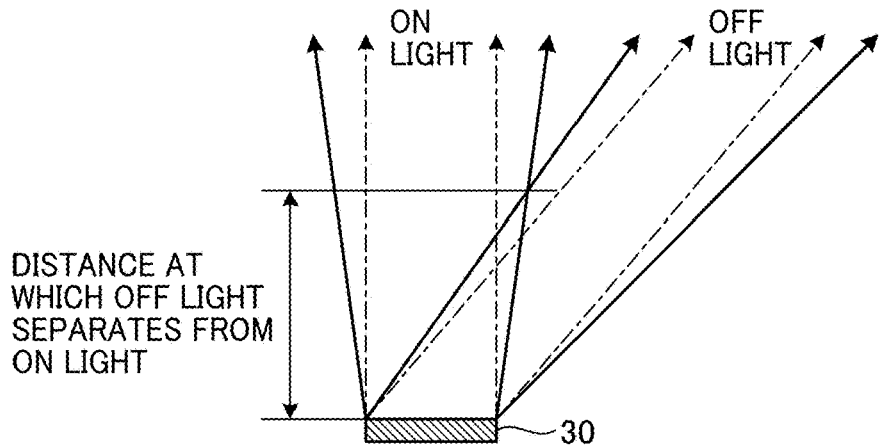
FIGS. 8A and 8B are illustrations describing a relation between the "ON" light and the "OFF" light from the DMD.
Figure 8B:
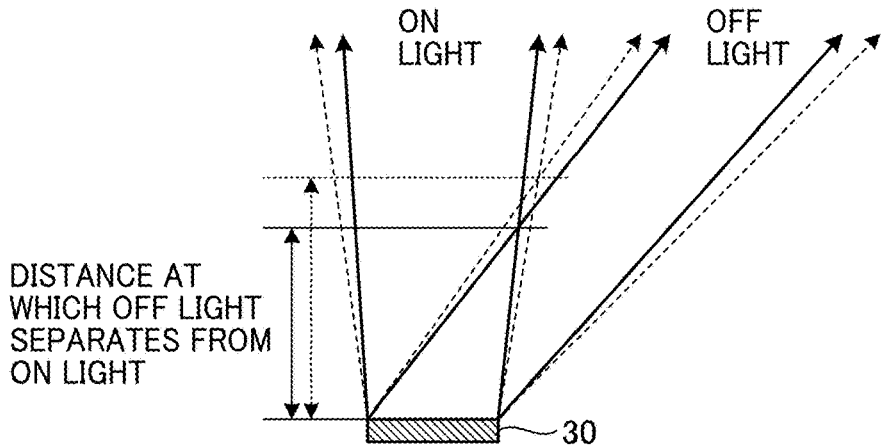

FIG. 6 is an illustration of the illuminance distribution of the on light in the x-y plane. FIG. 7 is an illustration of the illuminance distribution of the off light in the x-y plane. FIGS. 8A and 8B are illustrations of a relation between the on light and the off light of the DMD 30.

The illuminance distribution of the on light of the DMD 30 illustrated in FIG. 6 is obtained by a geometrical ray trace simulation. In the geometrical ray trace simulation, the movable micromirror 32 is in the on state as in FIG. 4C, and the tilt angle θ of the movable micromirror is 17°. Each movable micromirror 32 in the image display plane of the DMD is in the on state, and this state is referred to as full white (full on).

In FIG. 6, the sign D represents an outer diameter of the first lens 41 of the projection optical system, and an outline of the first lens 41 is depicted as a circle. In FIG. 6, the illuminance distribution generated by condensing the on light is referred to as ON. As illustrated in FIG. 6, the illuminance distribution is within the circle depicting the outline of the first lens 41. In the embodiment according to FIG. 6, the conditions for the geometrical ray trace simulation are as follows: the incident angle α is 35.5°; and the azimuth angle is 0°. The illuminance distribution is obtained on a plane that contacts with a vertex of the first lens 41 of the projection optical system 40, where the vertex of the first lens faces the DMD 30 and a surface including the vertex of the first lens 41 is curved. In FIG. 6, a profile viewed from the x-direction and a profile viewed from the y-direction for the illuminance distribution are also illustrated. The reflected light from the DMD 30 with such an illuminance distribution is projected onto the screen through the projection optical system 40.

The illuminance distribution of the off light of the DMD 30 illustrated in FIG. 7 is obtained by a geometrical ray trace simulation. In the geometrical ray trace simulation, the movable micromirror 32 is in the off state as in FIG. 4B, and the tilt angle θ of the movable micromirror is 17°. Each movable micromirror 32 in the image display plane of the DMD is in the off state, and this state is referred to as full black (full off).

The movable micromirror 32 in the off state tilts in a different direction from the on state. In FIG. 7, the sign D represents the outer diameter of the first lens 41 of the projection optical system, and the outline of the first lens 41 is depicted as a circle. The illuminance distribution generated by condensing the off light is referred to as OFF. As illustrated in FIG. 7, the illuminance distribution shifts to upper left from the circle depicting the outline of the first lens 41 and is completely out of the circle. As a result, ideally, no light passes through the first lens 41 of the projection optical system 41. This configuration prevents the off light from reaching the screen, thus achieving a full black screen.

The contrast ratio is defined, for example, as a ratio ("full on/off") of the illuminance of full on (full white) to the illuminance of full off (full black) (i.e., contrast ratio= (illuminance of full on)/(illuminance of full off)). The illuminance of full on (full white) is achieved by setting each movable micromirror 32 in the on state, and the illuminance of full off (full black) is achieved by setting each movable micromirror 32 in the off state. Alternatively, the contrast ratio is defined based on the contrast ratio according to American National Standards Institute (ANSI). The ANSI contrast ratio is determined by projecting a 4×4 checkerboard pattern (having four black rectangular areas and four white rectangular areas) onto a screen and measuring illuminances of all the areas. In any definition, as the illuminance of full off increases, the contrast ratio decreases, and the image quality deteriorates. If the off light, the diffraction light, or the stray light enters the first lens 41 of the projection optical system 40, the off light, diffraction light, or the stray light reaches the screen or the vicinity of the screen as ghost light. The ghost light also deteriorates the image quality. To avoid such a situation, one or more embodiments apply conditional expressions described below and techniques to prevent the off light, the diffraction light, or the stray light from entering the first lens 41 of the projection optical system 40.

Figure 9A:
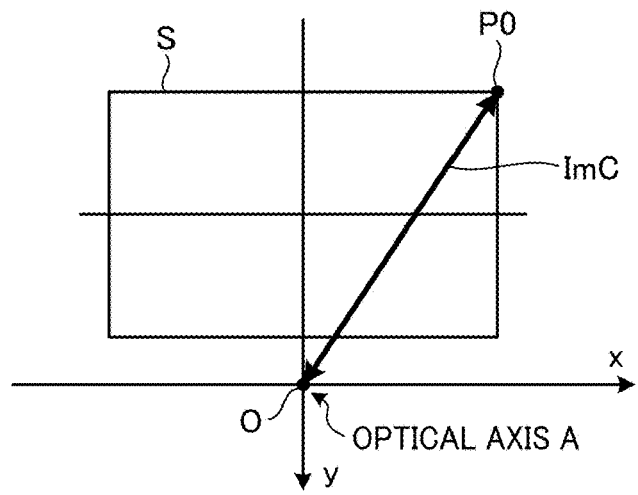
FIG. 9A is an illustration describing the image display plane of the DMD and the radius ImC of an image circle of the projection optical system.
Figure 9B:
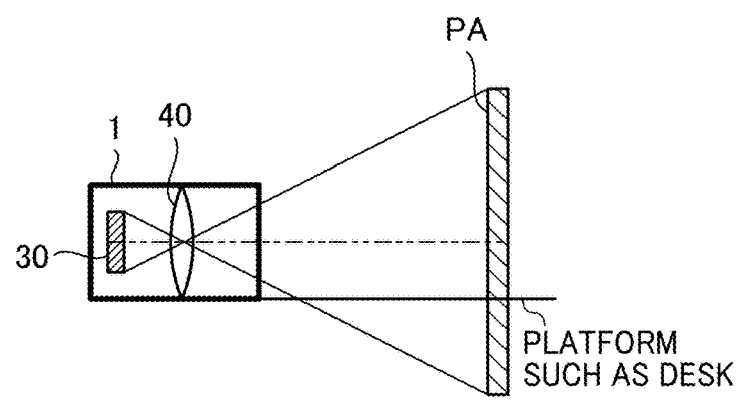
FIGS. 9B and 9C are schematic views of the image projection apparatus without and with offset of the DMD, respectively.
Figure 9C:
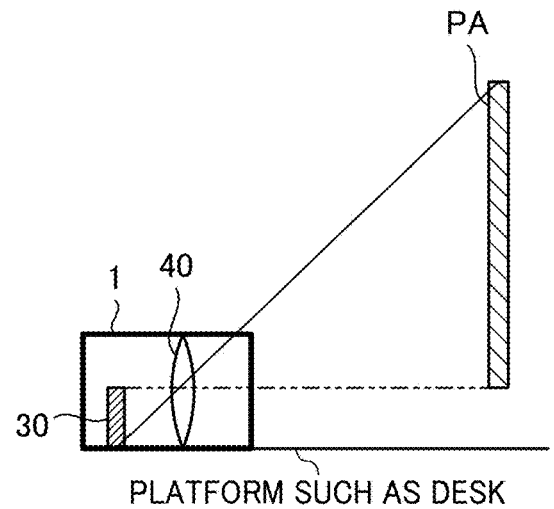

FIGS. 8A and 8B are illustrations of a relation between the on light and the off light of the DMD 30. FIG. 9A is an illustration of the image display plane of the DMD and an image circle of the projection optical system. FIGS. 9B and 9C are schematic views of the image projection apparatus without and with offset with respect to the DMD, respectively. The projection optical system 40 is described with reference to FIGS. 8A and 8B and FIGS. 9A to 9C.

Next, embodiments for miniaturization of the image projection apparatus 1 (e.g., a projector) are described. As described below, reducing the size of the projection optical system 40 substantially contributes to the miniaturization of the entire image projection apparatus 1.

A method of reducing the size of the projection optical system 40 involves increasing the f-number of the projection optical system 40. When the f-number of the projection optical system 40 is increased under the condition that the distance from the DMD 30 to the first lens 41 of the projection optical system 40 is constant, the outer diameter of the first lens 41 (the lens closest to the DMD 30) of the projection optical system 40 becomes smaller. The smaller outer diameter of the first lens 41 contributes to reducing the size of the projection optical system 40 and to preventing the off light, the diffraction light, or the stray light from entering the first lens 41. When applying the projection optical system with a larger f-number to the image projection apparatus using the DMD 30, the distance from the DMD 30 to the first lens 41 (i.e., the distance at which the off light separates from the on light) becomes shorter. The shorter distance from the DMD 30 to the first lens 41 also contributes to reducing the size of the projection optical system.

Referring to FIGS. 8A and 8B, the distance from the DMD 30 at which the off light separates from the on light is described.

FIG. 8A is an illustration of the on light and the off light reflected by the DMD 30 of the projection optical system 40 having a small f-number, and the on light is referred to as ON LIGHT, and the off light is referred to as OFF LIGHT. In FIG. 8A, the solid lines depict marginal rays for the on light and the off light, and the dashed lines depict principle rays for the on light and the off light. When a telecentric optical system is used, the width of the principal ray of the on light is substantially equal to the diagonal length of the image display plane of the DMD 30. In terms of the on light, the projection optical system 40 intakes both the principal rays and the marginal rays from the DMD 30 and projects them onto the screen. When the projection optical system 40 has a smaller f-number, such as 1.7, the projection optical system collects marginal rays farther away from the principal rays of the on light. By contrast, when the projection optical system has a larger f-number, such as 3.5, the projection optical system collects marginal rays closer to the principal rays of the on light.

FIG. 8B is an illustration describing the distance at which the off light separates from the on light, which varies with the f-number of the projection optical system 40. In FIG. 8B, the solid lines depict marginal rays of a larger f-number of the on light and the off light, and the dashed lines depict marginal rays having a smaller f-number for the on light and the off light. More specifically, the solid lines depict the on light and the off light having the same f-number of 1.7, and the dashed lines depicts the on light and the off light having the same f-number of 3.5 (i.e., f-number of the projection optical system is also 1.7 or 3.5). In FIG. 8B, a solid line (parallel to the y-axis) between two marginal rays of f-number of 3.5 refers to a width of the projection optical system of f-number 3.5, and a dashed line (parallel to the y-axis) between two marginal rays of f-number of 1.7 refers to a width of the projection optical system of f-number 1.7. It is clear from FIG. 8B that the width for the f-number 1.7 is wider than the width for the f-number 3.5, and the distance from the DMD 30 for the f-number 1.7 is longer than the distance from the DMD 30 for the f-number 3.5. Therefore, using the optical projection system 40 with a smaller f-number, the distance from the DMD to the first lens 41 of the projection optical system 40 becomes shorter. Therefore, by increasing the f-number of the projection optical system 40, the distance from the DMD 30 to the first lens 41 of the projection optical system is shortened, and an image projection apparatus (projector) achieves both a higher contrast ratio and a smaller size.

Referring to FIGS. 9A to 9C, offset of the projection optical system 40 is described. An optical system used in a projector, a center of the image display plane of an image display element (spatial light modulator) such as a DMD is usually offset from an extended line of the optical axis of the projection optical system in the x-y plane, where the image display plane is on the x-y plane If the center of the image display plane of the image display element (spatial light modulator) such as a DMD is coincident with the extended line of the optical axis of the projection optical system in the x-y plane, and the projector is placed on a platform such as a desk, a portion of the light projected from the projector is blocked by the platform such as a desk, failing to reach the projection area as illustrated in FIG. 9B. To avoid such a situation, a front part of the projector is to be tilted upward, which is, however, inconvenient for users. On the other hand, as illustrated in FIG. 9C, when the center of the image display element is offset downward in FIG. 9C from the extended line of the optical axis of the projection optical system, the projection area shifts upward in FIG. 9C with respect to the optical axis of the projection optical system because of the optical conjugate relation. This prevents the light forming the projection image from being at least partly blocked by the platform such as a desk, and increases convenience for users. As described above, it is usual to offset the center of the image display element (spatial light modulator) such as a DMD from the extended line of the optical axis of the projection optical system in the x-y plane.

In the present embodiment, the optical axis of the projection optical system 40 is referred to as an optical axis A as in FIG. 1 and FIG. 9A, where the optical axis A is parallel to the z-direction. In FIG. 9A, the rectangle area S enclosed by the solid lines in the x-y plane depicts the image display plane, and an intersection point of the optical axis A and the x-y plane including the image display plane (the rectangle area S) of the DMD 30 is referred to as an intersection point O. Any point on the image display plane S is P. A farthest point from the point O is referred to as P0, and the distance from the point O to the point P0 is referred to as ImC in FIG. 9A. The length of ImC corresponds to the radius of the image circle of the projection optical system 40, and the projection optical system requires the image circle having a radius of ImC to encompass an entire image display plane to project images onto the screen. The length of ImC varies with an amount of the offset for the DMD in the projection optical system 40. Typically, with an increasing offset, the area of the image circle increases, which further increases the size of, the projection optical system 40. In embodiments, the projection optical system, in particular, the first lens 41 closest to the DMD 30, is optimized by using the following conditional expressions to increase contrast ratio and reduce the size of projection optical system.

Hereinafter, the conditional expressions to improve the contrast ratio of the projection image by the projection optical system 40 is described.

In the image projection apparatus 1 according to the present embodiment, when the tilt (rotation) angle of the reflecting surface of the movable micromirror 32 with respect to the image display plane of the DMD 30 is θ1, diagonal length of the image display plane is L, and distance from the image display plane of the DMD 30 to the vertex of the first lens 41 of the projection optical system 40 along the optical axis A is BF, where the first lens 41 is closest to the image display surface of the DMD 30, and the vertex of the first lens 41 faces the image display plane of the DMD 30. In one or more embodiments, following conditional expressions (1) and (2) are satisfied.

$$\theta 1 \geq 14 (\deg) \quad (1)$$

$$1.2 < BF/L < 2.2 \quad (2)$$

The conditional expression (1) represents a preferable range of the tilt (rotation) angle θ of the movable micromirror 32. The DMD 30 reflects the on light and the off light in different directions according to the tilt (rotation) angle of the movable micromirror 32. When the tilt (rotation) angle θ is small, the off light may not sufficiently separate from the on light. As a result, the off light partly may enter the projection optical system 40, and the contrast ratio of the projection image decreases. By satisfying the conditional expression (1), the off light does not tend to enter the projection optical system 40.

The conditional expression (2) defines the range that enables miniaturization of the image projection apparatus 1, and increase in the contrast ratio by preventing the off light and a diffraction light of the off light from entering the projection optical system 40. When BF/L of the conditional expression (2) is 2.2 or more, it is preventable for the off light to enter the first lens 41 of the projection optical system 40. However, the backfocus BF becomes longer, and the size of the image projection apparatus 1 becomes lager. Moreover, when BF/L of the conditional expression (2) is 2.2 or more, the first lens 41 closest to the DMD 30 becomes larger, and the diffraction light and a stray light from the mechanical member of the illumination optical system 20 may enter the first lens 41 of projection optical system 40, causing the contrast ratio to decrease. On the other hand, when BF/L of the conditional expression (2) is 1.2 or less, the image projection apparatus 1 is miniaturized; however the off light may not be sufficiently separated from the on light. This causes the off light to partly enter the first lens 41 of the projection optical system, resulting in a decrease in the contrast ratio of the projection image. By satisfying the conditional expressions (1) and (2) simultaneously, the off light is sufficiently separated from the on light, and an amount of the off light and the stray light that enters the projection optical system 40 is minimized. As a result, the contrast ratio of the projected image is increased, and the image projection apparatus 1 is significantly miniaturized.

In one or more embodiments, a conditional expression (2a) is more preferably satisfied.

$$1.2 < BF/L < 1.9 \tag{2a}$$

When the conditional expression (2a) is satisfied, the contrast ratio further is increased.

In one or more embodiments, a conditional expression (2b) is still more preferably satisfied.

$$1.4 < BF/L < 1.8 \tag{2b}$$

When the conditional expression (2b) is satisfied, the off light is sufficiently separated from the on light. Accordingly, a light shield of a lens holder, or a holder, of the projection optical system 40 even with a simple shape allows a sufficient amount of the on light to enter the projection optical system 40 while blocking the off light. Such a light shield with a simple shape needs simpler manufacturing processes and lower costs. In other words, satisfying the conditional expression (2b) eliminates the need for a complicated shape for a light shield of a lens holder of the projection optical system 40, thus enabling lower costs.

In one or more embodiments, the conditional expression (3) is satisfied.

$$(D/2-ImC)/BF < 0.2 \tag{3}$$

where D is the outer diameter of the first lens 41 of the projection optical system 40, and ImC is the maximum distance between the point O and the point P0 (see FIG. 9).

The conditional expression (3) limits an upper limit of the outer diameter of the first lens 41 of the projection optical system 40, where the first lens 41 is closest to the image display plane. By increasing the outer diameter D as much as possible, the light utilization efficiency of the image projection apparatus 1 increases, but at the same time, the contrast ratio decreases. Along with the conditional expressions (1) and (2), an optimum range for the conditional expression (3) is determined. When (D/2–ImC)/BF of the conditional expression (3) is 0.2 or more, as described above, the off light, diffraction light, and the stray light from the mechanical members enter the projection optical system 40, and the contrast ratio decreases.

In one or more embodiments, a conditional expression (3a) is more preferably satisfied.

$$(D/2-ImC)/BF < 0.18 \tag{3a}$$

When the conditional expression (3a) is satisfied, the contrast ratio further increases. In one or more embodiments, a conditional expression (3b) is more preferably satisfied.

$$-0.5 < (D/2-ImC)/BF < 0.15 \tag{3b}$$

In one or more embodiments, the projection optical system 40 is a telecentric lens. When a telecentric optical lens is applied to the projection optical system 40, the illumination optical system having high utilization efficiency is selected.

In one or more embodiments, a field stop 44 is disposed between the DMD 30 and an aperture stop 46 of the projection optical system 40 (FIG. 1). When the field stop 44 is between the DMD 30 and the aperture stop 46 (where the light beam is the thinnest in the projection optical system 40) (FIG. 1), an upper ray is cut, and coma aberration at a higher image height in the projection optical system 40 is reduced. Such a reduction of the coma aberration enables a higher resolution image. Moreover, in a projection optical system including one or more mirrors for an ultra-short focal length, the optical projection system is miniaturized because light reflected by a mirror closest to the enlarging side does not tend to hit one or more lenses in the projection optical system. Furthermore, since the field stop 44 (FIG. 1) cuts the diffraction light or the stray light, the contrast ratio increases.

In one or more embodiments, when multiple optical elements are disposed between the projection optical system 40 and the DMD 30, and T is the total thickness of the multiple optical elements, the ratio of the total thickness T to the backfocus BF satisfies a conditional expression (4).

$$T/BF < 0.7 \tag{4}$$

The conditional expression (4) defines the upper limit of the ratio of the total thickness of the optical elements T to the backfocus BF. If T/BF of the conditional expression (4) is 0.7 or more, the off light is insufficiently separated from the on light, at the position of the first lens 41 of the projection optical system 40, where the first lens 41 is closest to the DMD 30, and the off light from the DMD 30 partially enters the first lens 41. As a result, the contrast ratio decreases. In the one or more embodiments satisfying the conditional expression (4), the off light is sufficiently separated from the on light even with a short backfocus, and the off light from the DMD 30 does not enter the first lens 41. As a result, the contrast ratio is increased.

In one or more embodiments, the multiple optical elements include at least one parallel flat plate 45 for the pixel shift technique, and the parallel flat plat 45 is repeatedly switched between a tilted state and an untilted state with respect to the optical axis A by a driver (FIG. 1). The parallel flat plate 45 may tilt in one or more directions. By tilting the parallel flat plate 45 (FIG. 1), the optical path of the projection optical system shifts into two or more optical paths parallel to each other. According to the shift of the optical path, a pixel image projected onto a screen also shifts (i.e., the pixel shift technique). As a result, the resolution of the spatial light modulator such as the DMD increases. For example, the parallel flat plate 45 is tilted in four different states (i.e., the pixel shift technique) to achieve an image with four times higher resolution. The image with four times higher resolution is formed by four lower resolution images, and these four lower resolution images are sequentially projected according to switching of the tilt states of the parallel flat plate 45.

Figure 10:
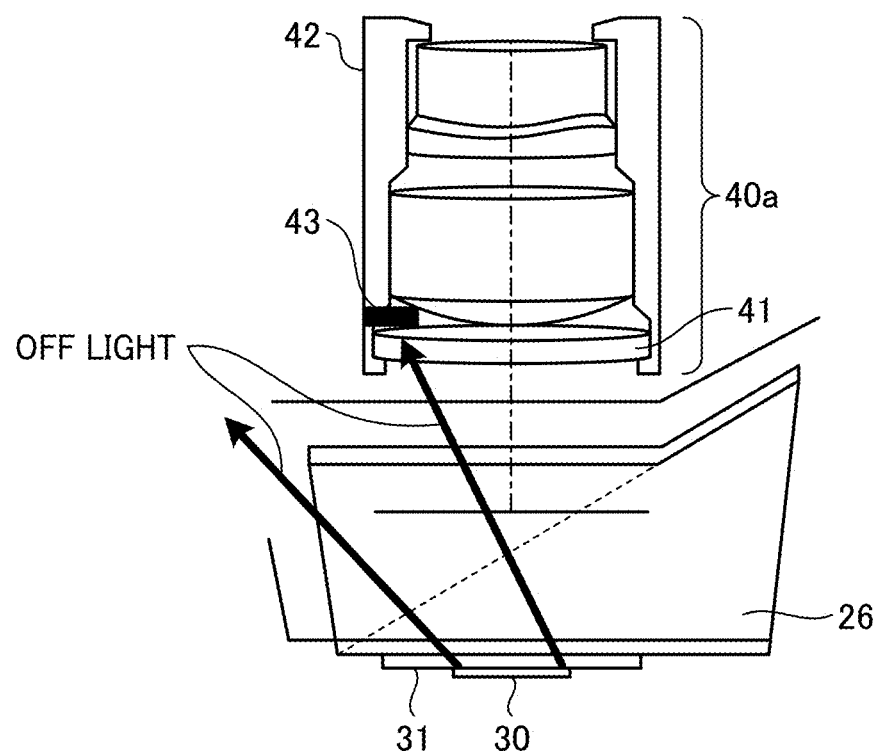
FIG. 10 is a schematic view of a projection optical system in the image projection apparatus according to the first embodiment of the present invention in which a light shield is provided.

In one or more embodiments, a light shield 43 is provided in a lens holder 42, specifically at a position where the off light and the diffraction light enter the projection optical system 40, as illustrated in FIG. 10. The lens holder 42 holds a lens group closest to the image display plane of the DMD 30. The light shield 43 may have a structure to shield or absorb the off light and the diffraction light. The lens group refers to one or more lenses between the aperture stop 46 and the DMD 30 (FIG. 1). Since the light shield 43 blocks or absorbs the off light and the diffraction light at this position, and the off light and the diffraction light do not pass through the projection optical system 40 any farther, the contrast ratio increases without loss of the light utilization efficiency. The light shield 43 may be a part of the lens holder 42 as a single integrated unit or may be separate from the lens holder 42 as a separate member.

In one or more embodiments, etendue that is a property of light satisfies a following conditional expression (5).

$$Et < 35 (mm^2 \cdot sr) \tag{5}$$

In this conditional expression (5), Et represents etendue, and etendue is defined by the equation (6).

$$Et = M \times \pi \times NA^2 \tag{6}$$

where M is the area of the image display plane of the DMD 30 and the numerical aperture NA of the projection optical system 40. The relation between the numeral aperture NA and the f-number is f-number=1/(2NA). In the equation (6), if the area of the image display M is constant, an optical system with a larger f-number has a smaller etendue. On the contrary, if the area of the image display M is constant, an optical system with a smaller f-number has a larger etendue.

The conditional expression (5) defines the upper limit of etendue for the light source and the illumination optical system 20. By satisfying the conditional expressions (1), (2), (4), and (5) simultaneously, the off light is sufficiently separated from the on light with a short backfocus of the projection optical system 40, and the off light, the diffraction light, or stray light does not tend to enter the projection optical system 40. As a result, the contrast ratio is increased and the size of the image projection apparatus 1 is miniaturized.

In one or more embodiments, the etendue satisfies the following conditional expression (5a).

$$Et<20(mm^2 \cdot sr) \qquad (5a)$$

In one or more embodiments, a conditional expression (5b) is satisfied.

$$Et<17(mm^2 \cdot sr) \qquad (5b)$$

As described above, in the image projection apparatus 1 according to the present embodiment, by satisfying the conditional expressions (1) and (2), the off light is sufficiently separated from the on light, and the off light, the diffraction light, or the stray light entering the projection optical system 40 is minimized. As a result, the contrast ratio of the projection image increases, and the image projection apparatus 1 is significantly miniaturized. In particular, the conditional expressions related to the backfocus greatly contributes to miniaturization of the projection optical system 40, and consequently the image projection apparatus 1 is significantly miniaturized.

Second Embodiment

The image projection apparatus 1 according to the second embodiment is described focusing on the differences from the image projection apparatus 1 according to the first embodiment. In the first embodiment, a lamp light source is used as the light source 10. In the second embodiment, a semiconductor laser is used as the light source 10.

Figure 11:
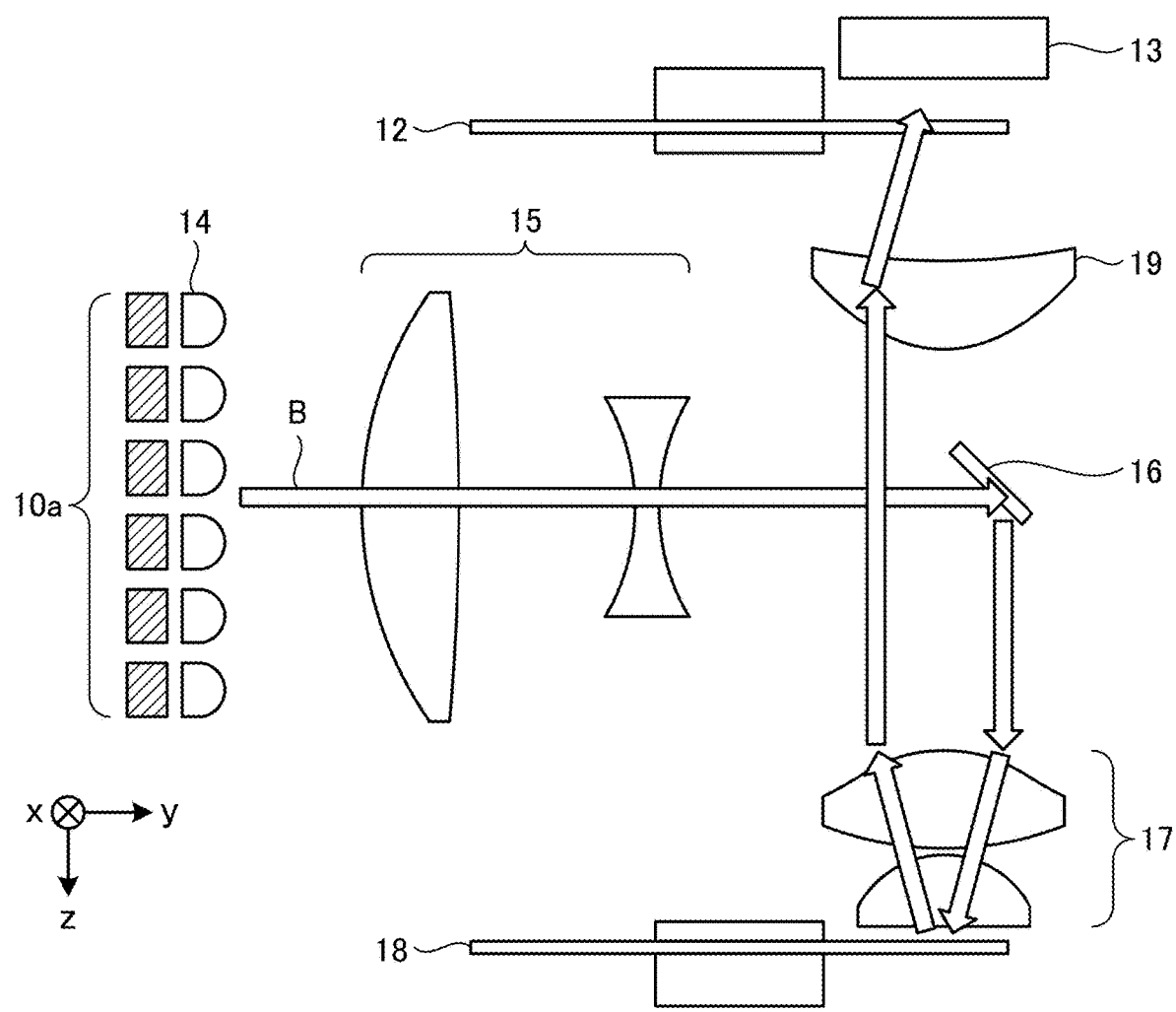
FIG. 11 is a schematic view of an image display device in an image projection apparatus according to a second embodiment of the present invention.

FIG. 11 is a schematic view of the image display device using the semiconductor laser as the light source. The image display device is a part of the image projection apparatus. Referring to FIG. 11, the image display device according to the present embodiment is described.

As illustrated in FIG. 11, the image display device 2 of the image projection apparatus 1 according to the present embodiment includes a light source 10a, a collimator lens 14, a first lens group 15, a dichroic mirror 16, a second lens group 17, a phosphor wheel 18, and a third lens group 19. In the configuration, these components are arranged in that order along the propagation path of the illumination light emitted from the light source 10a. As with the first embodiment according to FIG. 1, the image display device 2 includes a color wheel 12, a light tunnel 13, an illumination optical system 20, the DMD 30, and a cover glass 31. In FIG. 11, the illumination optical system 20, the DMD 30, and the cover glass 31 are omitted for sake of simplicity.

The light source 10a includes multiple solid-state light sources such as a semiconductor laser. The light source 10a emits blue light having, for example, a central wavelength of 455 nm. The blue light is used as the excitation light B to excite the phosphor included in the phosphor wheel 18 described later. Specifically, the light source 10a is a laser light source, and the blue laser light emitted from the light source 10a is linearly polarized light, and the polarization state is constant. The light source 10a is arranged to emit S-polarized light to the dichroic mirror 16 described later. The excitation light B emitted by the light source 10a may have another wavelength band as long as the phosphor of the phosphor wheel 18 is excited. The light source according to the present embodiment is not limited to the multiple solid-state light sources as illustrated in FIG. 11, and may be, for example, a single solid-state light source. The multiple solid-state light sources may be provided on a substrate in an array as a light source unit, but are not limited thereto.

The collimator lens 14 substantially collimates the excitation light B emitted by each light source 10a as the illumination light. The first lens group 15 guides the excitation light B substantially collimated by the collimator lens 14, to the dichroic mirror 16.

The dichroic mirror 16 is, for example, a parallel flat glass plate, and has a coating that reflects the light with the wavelength band including the excitation light B and transmits the fluorescent light emitted by the phosphor wheel 18. The excitation light B reflected by the dichroic mirror 16 is shifted with respect to the optical axis of the second lens group 17.

As illustrated in FIG. 11, the second lens group 17 refracts the excitation light B reflected by the dichroic mirror 16, and the excitation light B refracted by the second lens group 17 enters the phosphor wheel 18 with tilting to the normal line of the phosphor wheel 18.

The phosphor wheel 18 is, for example, a circular plate having a phosphor. When the excitation light B from the second lens group 17 hits the phosphor, the phosphor is excited by the excitation light B and emits fluorescence light. The fluorescent light emitted by the phosphor wheel 18 is substantially collimated by passing through the second lens group 17 and enters the third lens group 19 through an optical path that is substantially parallel to the optical axis of the second lens group 17 and opposite to the dichroic mirror 16 with respect to the optical axis. The third lens group 19 condenses the fluorescence light from the phosphor wheel 18 through the second lens group 17 to the color wheel.

As described in the first embodiment, the color wheel 12 is, for example, a circular plate with several different color sections that separate the illumination light emitted from the light source 10a into predetermined colors (for example, red, green, and blue). As described above in the first embodiment, the light tunnel 13 is, for example, a hollow quadrangular prism that guides the illumination light transmitted through the color wheel 12 to the illumination optical system 20.

In the second embodiment, the configuration after the light tunnel 13 is the same as the configuration according to the first embodiment.

As described above, in the image projection apparatus 1 according to the second embodiment, the image display device 2 uses a solid-state light source 10a such as semiconductor laser. In the second embodiment, the off light is sufficiently separated from the on light, and the diffraction light or the stray light is minimized. As a result, the contrast ratio of the projected image increases, and the projection optical system 40 and the image projection apparatus are substantially miniaturized. These effects by the second embodiment are the same as the first embodiment.

Examples

Specifically, in the image projection apparatus 1 according to the first embodiment and the second embodiment described above, the maximum tilt angle θ1, the backfocus BF, the diagonal length L of the image display plane of the DMD, the outer diameter D of the first lens of the projection optical system, the radius ImC of the image circle, the total thickness T of the optical elements, and the etendue Et are represented in Table 1 as Examples 1 to 5.

TABLE 1

| Example | θ1 [°] | BF [mm] | L [mm] | D [mm] | ImC [mm] | T [mm] | Et |
|---|---|---|---|---|---|---|---|
| 1 | 17 | 38 | 25.0054 | 33 | 18.4 | 21.5 | 16.54 |
| 2 | 17 | 38 | 25.0054 | 33 | 18.4 | 21.5 | 16.54 |
| 3 | 17 | 50 | 25.0054 | 45 | 18.4 | 24.3 | 32.42 |
| 4 | 17 | 55 | 25.0054 | 52.8 | 18.4 | 21.5 | 16.54 |
| 5 | 17 | 45 | 25.0054 | 47 | 18.4 | 20 | 10.01 |

The specific values for the parameters above mentioned are not limited to the values represented in Table 1 and are changed appropriately.

By setting the specific values for the parameters in Table 1 to conditional expressions (1) to (5), the results of the conditional expressions (1) to (5) are obtained (Table.2).

TABLE 2

| Example | Conditional Expression (1) | Conditional Expression (2) | Conditional Expression (3) | Conditional Expression (4) | Conditional Expression (5) |
|---|---|---|---|---|---|
| Parameters/Character Set | θ1 | BF/L | (D/2−ImC)/BF | T/BF | Et |
| Upper Limit | — | 2.2 | 0.2 | 0.7 | 35 |
| Lower Limit | 14 | 1.2 | — | — | — |
| 1 | 17 | 1.52 | −0.050 | 0.566 | 16.54 |
| 2 | 17 | 1.52 | −0.050 | 0.566 | 16.54 |
| 3 | 17 | 2.0 | 0.082 | 0.486 | 32.42 |
| 4 | 17 | 2.2 | 0.145 | 0.391 | 16.54 |
| 5 | 17 | 1.8 | 0.113 | 0.444 | 10.01 |

As represented in Table 2, in any Examples 1 to 5, the parameters θ1 and Et, and character sets BF/F, (D/2−ImC)/BF and T/BF satisfy all conditional expressions (1) to (5). Since conditional expressions (1) to (5) are satisfied, the contrast ratio increases, and the size is miniaturized for the image projection apparatus 1.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. An image projection apparatus comprising:
a light source configured to emit light;
an image display element configured to reflect the light emitted from the light source, the image display element including:
multiple micromirrors each having a reflecting surface, the multiple micromirrors arranged in two dimensions and forming an image display plane, each micromirror configured to change an angle of the reflecting surface with respect to the image display plane to change a direction of the light reflected by the reflecting surface; and
a projection optical system configured to project the light reflected from the image display element onto a projection surface as a projection image,
wherein conditional expressions (1) and (2) below are satisfied:

$$\theta 1 \geq 14 \text{(deg)} \quad (1)$$

$$1.2 < BF/L < 2.2 \quad (2)$$

where θ1 is a maximum tilt angle of the reflecting surface of each micromirror with respect to the image display plane, L is a diagonal length of the image display plane, and BF is a distance between a vertex of a lens within the projection optical system and closest to the image display plane and the image display plane along an optical axis of the projection optical system, wherein conditional expression (3) below is satisfied:

$$(D/2 - ImC)/BF < 0.2 \quad (3)$$

where D is an outer diameter of the lens within the projection optical system and closest to the image display plane, and ImC is a distance from an intersection point of the optical axis and a plane including the image display plane to a point farthest from the intersection point within the image display plane.

2. The image projection apparatus according to claim 1, wherein the projection optical system is a telecentric lens.

3. The image projection apparatus according to claim 1, wherein the projection optical system includes an aperture stop and a field stop, the field stop is closer to the image display element than the aperture stop.

4. The image projection apparatus according to claim 1, wherein the projection optical system further includes:
a holder holding a lens group within the projection optical system and closest to the image display element; and
a light shield on the holder, the light shield configured to absorb light.

5. The image projection apparatus according to claim 1, wherein a center of the image display plane of the image display element is offset from an extended line of the optical axis of the projection optical system.

6. An image projection apparatus comprising:
a light source configured to emit light;
an image display element configured to reflect the light emitted from the light source, the image display element including:
multiple micromirrors each having a reflecting surface, the multiple micromirrors arranged in two dimensions and forming an image display plane, each micromirror configured to change an angle of the reflecting surface with respect to the image display plane to change a direction of the light reflected by the reflecting surface; and a projection optical system configured to project the light reflected from the image display element onto a projection surface as a projection image, wherein conditional expressions (1) and (2) below are satisfied:

$$\theta 1 \geq 14 (\deg) \tag{1}$$

$$1.2 < BF/L < 2.2 \tag{2}$$

where θ1 is a maximum tilt angle of the reflecting surface of each micromirror with respect to the image display plane, L is a diagonal length of the image display plane, and BF is a distance between a vertex of a lens within the projection optical system and closest to the image display plane and the image display plane along an optical axis of the projection optical system, the image projection apparatus further comprising multiple optical elements between the projection optical system and the image display element, wherein conditional expression (4) below is satisfied:

$$T/BF < 0.7 \tag{4}$$

where T is a total thickness of the multiple optical elements.

7. The image projection apparatus according to claim 6, wherein the multiple optical elements include at least one parallel flat plate configured to tilt with respect to the optical axis.

8. An image projection apparatus comprising:
a light source configured to emit light;
an image display element configured to reflect the light emitted from the light source, the image display element including:
multiple micromirrors each having a reflecting surface, the multiple micromirrors arranged in two dimensions and forming an image display plane, each micromirror configured to change an angle of the reflecting surface with respect to the image display plane to change a direction of the light reflected by the reflecting surface; and a projection optical system configured to project the light reflected from the image display element onto a projection surface as a projection image, wherein conditional expressions (1) and (2) below are satisfied:

$$\theta 1 \geq 14 (\deg) \tag{1}$$

$$1.2 < BF/L < 2.2 \tag{2}$$

where θ1 is a maximum tilt angle of the reflecting surface of each micromirror with respect to the image display plane, L is a diagonal length of the image display plane, and BF is a distance between a vertex of a lens within the projection optical system and closest to the image display plane and the image display plane along an optical axis of the projection optical system, wherein conditional expression (5) below is satisfied:

$$Et < 35 (m^2 \cdot sr) \tag{5}$$

where Et is an etendue defined by equation (6) below:

$$Et = M \times \pi \times NA^2 \tag{6}$$

where M is an area of the image display plane, and NA is a numerical aperture of the projection optical system.

* * * * *